United States Patent
Lin et al.

(10) Patent No.: US 10,287,390 B2
(45) Date of Patent: May 14, 2019

(54) METHOD OF PREPARING ACCELERATOR, CURING AGENT AND DILUENT AND APPLYING THE SAME TO ELIMINATE AMINE BLUSHING AND AMINE BLOOMING

(71) Applicants: Teng-Ke Lin, Taipei (TW); Joseph-Shaw Lin, Taipei (TW)

(72) Inventors: Teng-Ke Lin, Taipei (TW); Joseph-Shaw Lin, Taipei (TW)

( * ) Notice: Subject to any disclaimer, the term of this patent is extended or adjusted under 35 U.S.C. 154(b) by 424 days.

(21) Appl. No.: 15/096,637

(22) Filed: Apr. 12, 2016

(65) Prior Publication Data

US 2016/0326302 A1    Nov. 10, 2016

(30) Foreign Application Priority Data

May 4, 2015   (CN) .......................... 2015 1 0220718

(51) Int. Cl.
| | |
|---|---|
| *C08K 5/17* | (2006.01) |
| *C08G 59/62* | (2006.01) |
| *C08G 18/32* | (2006.01) |
| *C08G 59/40* | (2006.01) |
| *C08G 59/68* | (2006.01) |

(52) U.S. Cl.
CPC ....... *C08G 59/623* (2013.01); *C08G 18/3225* (2013.01); *C08G 59/4014* (2013.01); *C08G 59/686* (2013.01)

(58) Field of Classification Search
CPC ...... C08G 18/08; C08G 59/62; C08G 59/623; C08G 73/02; C08K 5/17; C08L 75/02; C08L 75/04; C07C 213/02; C07C 215/50
See application file for complete search history.

(56) References Cited

FOREIGN PATENT DOCUMENTS

CN    103102506 A  *  5/2013  .............. C08K 5/17

* cited by examiner

*Primary Examiner* — Bijan Ahvazi
(74) *Attorney, Agent, or Firm* — Rosenberg, Klein & Lee

(57) ABSTRACT

Disclosed is an extension of a partial application of the previous invention (P.R.C. Pat. Application No. 201110357015.X) that overcomes the issues of the previous invention requiring a too long curing time of the accelerator, curing agent and diluent after they are mixed with epoxy resin, polyurethane resin, polyurea resin and polyisocyanate resin at the conditions of low temperature and high humidity and producing amine blushing, amine blooming or treaded surface phenomenon. The present invention reduces the curing time and overcomes the aforementioned drawbacks of the resins effectively.

2 Claims, No Drawings

METHOD OF PREPARING ACCELERATOR, CURING AGENT AND DILUENT AND APPLYING THE SAME TO ELIMINATE AMINE BLUSHING AND AMINE BLOOMING

FIELD OF THE INVENTION

The present invention is an extension of a partial application of the previous invention (P.R.C. Pat. Application No. 201110357015.X) that relates to a method of preparing a curing agent and an accelerator, and more particularly to a curing agent and a diluent and using the same to eliminate amine blushing and amine blooming, and more particularly to the method of preparing a curing agent and an accelerator by Mannich condensation reaction and transamination, and previous invention also relates to the use of the method and the curing agent and accelerator derived from cashew nut shell liquid (CNSL) which are the curing agent, accelerator and diluent applied in materials such as epoxy resins, polyurethane resins, and polyurea resins, and the recipe and proportion of the product manufactured by the previous invention may be adjusted appropriately to achieve the effects of enhancing the low-temperature curing effect as well as overcoming the long existing problems of a hardener including the amine blushing, amine blooming or treaded surface phenomenon.

BACKGROUND OF THE INVENTION

Epoxy resin, polyurethane resin, polyurea resin and polyisocyanate resin are main materials used for the purpose of protecting an industrial floor or a coating on a surface of the industrial floor or decorating a commercial floor and are most famous for their use as an industrial anti-corrosion coating, and the coating is performed most effectively above room temperature.

On the other hand, most epoxy resin coatings cured at room temperature generally uses modified polyamine as a curing agent, but the required curing time is too long in cold weather. More seriously, surface defects including ugly and destructive spots such as amine blushing, amine blooming, extrudate or blooming, or white powder are formed after epoxy resin, polyurethane and polyurea ester are mixed with various different types of hardeners at cold weather and high humidity. The aforementioned spots or phenomena can be eliminated and washed away by soap water or surfactants, but it incurs additional labor and costs and requires drying the coated surface before washing away the spots. As a result, the working time will be extended and there is a risk for the delayed schedule or penalty due to the delay. In addition, the method of washing away the spots not just incurs additional labor and costs only, but also fails to guarantee a complete removal of the spots.

Amine blushing and amine blooming are two different chemical reactions, wherein amine blushing refers to a chemical reaction (more specifically, an amination reaction) on a film surface on where water and carbon dioxide are condensed, and white spots are formed due to water vaporization, so that the film surface become tarnished and ugly; and amine blooming refers to a chemical reaction of a water soluble substance disposed in the coating resin and risen to the surface with water and carbon dioxide in air and thus a transparent water-soluble oil is remained on a film surface. If the aforementioned amine blushing and amine blooming are not eliminated or processed, and the coating is coated on the film surface, then the oily substance will act like a mold release agent to peel up the film surface and coating, and most curing agents are hydrophilic and will absorb water and carbon dioxide in the air, and if the curing agent is too hydrophilic, then it will not dissolve the lipophilic epoxy resin easily, and thus will cause an unclear mixture; and both polyamine and polyamide will produce amine blushing and amine blooming, and the polyamine has a greater chance of producing amine blushing and amine blooming.

In addition, epoxy resin, polyurethane resin, polyurea resin, polyisocyanate resin or polyamine hardener has been invented for over fifty or sixty years, and the aforementioned existing problem still cannot be solved, and users and manufacturers become helpless, and major companies producing epoxy resin such as Dow Chemical Company did not come up with a feasible solution, and an article entitled "Amine Blushing and Blooming of Epoxy Binder Systems" issued by Dow Chemical Company's Technical bulletin indicates that there are tens of users have requested the company to provide solutions, but up to now, the problem still remains unsolved, and the only recommendation to users is to clean and wash the surface with water and then rub and wipe the surface. Obviously, it cannot solve the problem thoroughly.

Another conventional solution recommends that the surface construction is performed in fine and warm weather to avoid amine blushing, amine blooming extrudate or blooming as much as possible. Therefore, the constructors will observe the change of weather before construction and announce suspension when the weather is forecasted to be cold and humid. However, this method still cannot guarantee, particularly the weather conditions cannot be predicted accurately during the construction period among the scheduling of many long-time constructions periods. Even the weather conditions are unfavorable, the construction has to be continued according to the schedule as set forth in contract, and the aforementioned surface problem is still a problem. If this problem is ignored and the defected surface is coated, the coating will not be fixed securely and will be peeled off easily, and the whole construction will fail.

Recently, a series of patents including U.S. Pat. Nos. 8,143,331, 8,147,964, 8,168,296, 8,198,395, 8,318,309, 8,501,997 and U.S. Pat. No. 8,513,376) issued to Air-Products and Chemicals, Inc., USA discloses that highly lipophilic hydrocarbon functional groups or benzene functional groups are linked to polyamine molecules to improve the lipophilicity of polyamine, but hydrogen gas is added to the process, and the pressure is applied up to 800~850 psi (approximately 60 atmospheres), so that a high-pressure reactor is required and a high production cost is incurred. In addition, the catalyst used is a noble metal which is discarded after a one-time use, not just manufacturing the product with a very high cost only, but also involving an environmental protection issue, and a good effect cannot be achieved since the idea of using a benzyl group to convert hydrophilic polyamines to lipophilic polyamines is too simple and immature.

For instance, a lipophilic benzene molecule is added to a highly lipophilic cardanol, and cardanol has a 15-carbon side chain and is very lipophilic, so that at least one benzyl group must be added in order to convert the highly hydrophilic polyamine into lipophilic polyamine. In claim 6 of P.R.C. Pat. No. 201110357015.X (hereinafter referred to as "Previous Invention" issued to the inventor of the present invention, aldehyde compounds including formaldehyde, acetaldehyde, propionaldehyde, butyraldehyde or benzaldehyde and their mixtures are used, and benzaldehyde is used in an embodiment, and its structure is given in the following Formula (i):

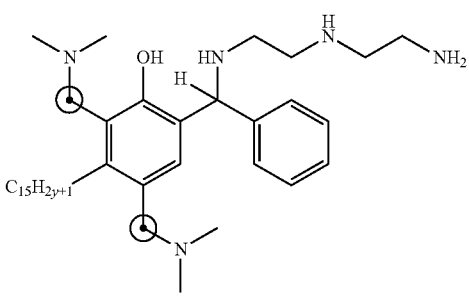
(i)

Wherein, the structure represented by the upper right side of Formula (i) is a diethylenetriamine (DETA). One of the two lipophilic structures of Formula (i) is a long carbon chain $C_{15}H_{2y+1}$ represented by the lower left side of Formula (i), wherein y is an integer from 12 to 15, and the other lipophilic structure is a benzyl group represented by the right side of Formula (i), so that the hydrophilic DETA can be converted into lipophilic DETA.

In view of the aforementioned problems, the inventors of the present invention conducted researches and experiments, and finally developed a preparation of an accelerator, a curing agent and a diluent to modify the chemical molecular structure of the original coating and adjust the recipe and proportion to overcome the aforementioned problem thoroughly.

SUMMARY OF THE INVENTION

The prior art is lack of a curing agent capable of curing a substance in an environment of low temperature and high humidity. Although the previous invention patent (P.R.C. Pat. Application No. 201110357015.X) provides a solution, yet defects and ugly or destructive spots such as amine blushing, amine blooming extrudate or blooming or white powder are still often found on a constructed surface. The present invention provides an accelerator consisting of seven compounds represented by the following structural Formulas (1), (2), (3), (4), (5), (6) and (7) respectively:

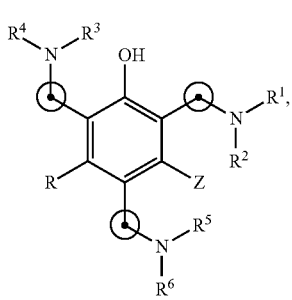
(1)

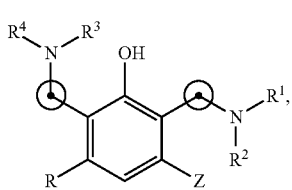
(2)

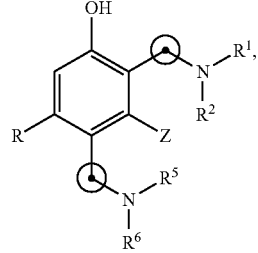
(3)

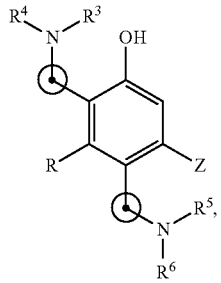
(4)

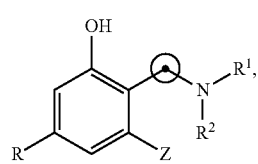
(5)

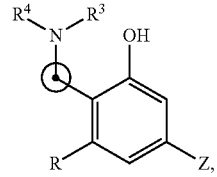
(6)

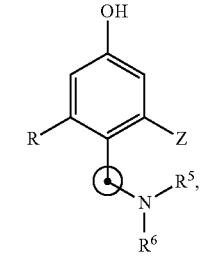
(7)

Wherein, R is $C_4H_9$, $C_9H_{19}$ or $C_{15}H_{2X+1}$, and X is any integer from 12 and 15; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixture produced in Mannich condensation reaction; the compound of Formula (1) has a weight percentage from 40% to 95%; the compounds of Formulas (2), (3) and (4) have a total weight percentage from 2.5% to 30%; and the compounds of Formulas (5), (6) and (7) have a total weight percentage from 2.5% to 30%.

In the accelerator for eliminating amine blushing and amine blooming, ⊙ is a radical moiety of benzaldehyde produced in Mannich condensation reaction.

In the accelerator for eliminating amine blushing and amine blooming, the accelerator is a diluent of a curing agent.

The present invention further provides a first curing agent for eliminating amine blushing and amine blooming, consisting of six compounds represented by the following structural formulas respectively:

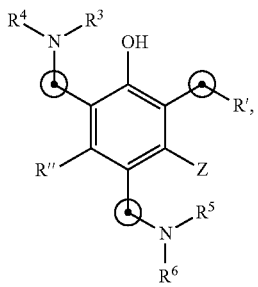
(8)

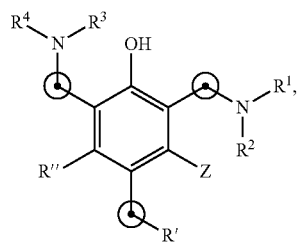
(9)

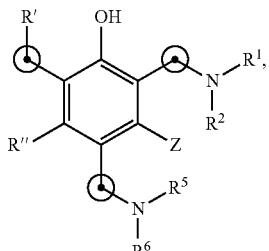
(10)

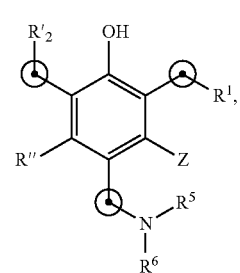
(11)

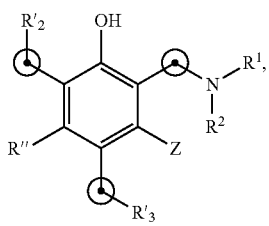
(12)

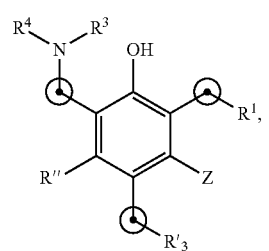
(13)

Wherein, R″ is H, $C_4H_9$, $C_9H_{19}$ or $C_{15}H_{2X+1}$, and X is any integer from 12 to 15; R', $R'_1$, $R'_2$ and $R'_3$ are polyamine radicals; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixtures produced in Mannich condensation reaction; the compounds of Formulas (8), (9) and (10) have a total weight percentage from 40% to 95%; and the compounds of Formulas (11), (12) and (13) have a total weight percentage from 5% to 60%.

In the first curing agent for eliminating amine blushing and amine blooming, ⊙ is a radical moiety of benzaldehyde produced in Mannich condensation reaction.

The present invention further provides a diluent of an accelerator or a curing agent for eliminating amine blushing and amine blooming, consisting of seven compounds represented by the following structural Formulas (14), (15), (16), (17), (18), (19) and (20) respectively:

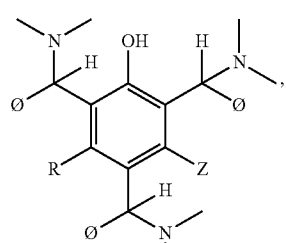
(14)

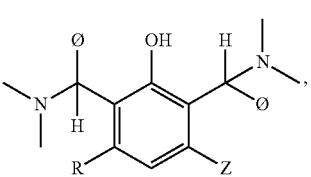
(15)

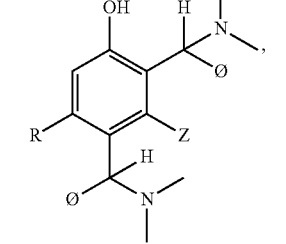
(16)

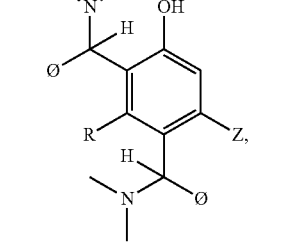
(17)

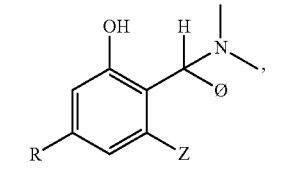
(18)

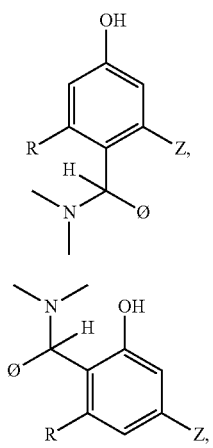

(19)

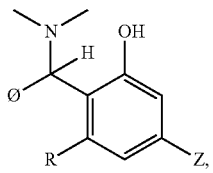

(20)

Wherein, R is $C_4H_9$, $C_9H_{19}$ or $C_{15}H_{2X+1}$, and X is any integer from 12 to 15; $R^1$, $R^2$, $R^3$, $R^4$, $R^5$ and $R^6$ are $CH_3$, $C_2H_5$, $C_3H_7$ or $C_4H_9$; Z is H or OH; Ø is benzene ring; the compound of Formula (14) has a weight percentage from 40% to 95%; the compounds of Formulas (15), (16) and (17) have a total weight percentage from 2.5% to 30%; and the compounds of Formulas (18), (19) and (20) have a total weight percentage from 2.5% to 30%.

The present invention further provides a second curing agent for eliminating amine blushing and amine blooming, consisting of six compounds represented by the following structural Formulas (21), (22), (23), (24), (25) and (26) respectively:

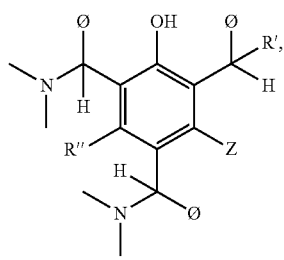

(21)

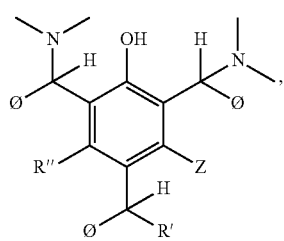

(22)

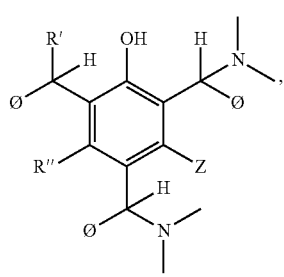

(23)

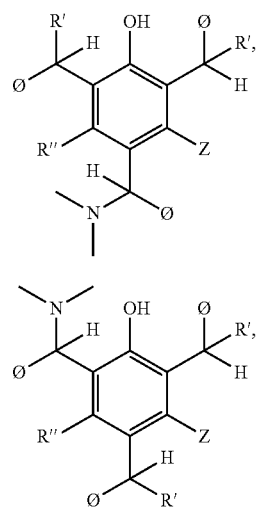

(24)

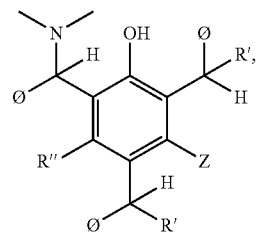

(25)

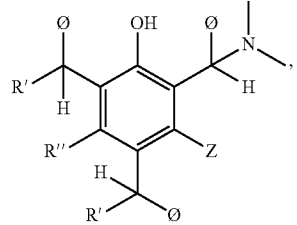

(26)

Wherein, R" is H, $C_4H_9$, $C_9H_{19}$ or $C_{15}H_{2X+1}$, and X is any integer from 12 to 15; R' is a polyamine radical; $R^1$, $R^2$, $R^3$, $R^4$, $R^5$ and $R^6$ are $CH_3$, $C_2H_5$, $C_3H_7$ or $C_4H_9$; Z is H or OH; Ø is benzene ring; the compounds of Formulas (21), (22) and (23) have a total weight percentage from 40% to 95%; and the compounds of Formulas (24), (25) and (26) have a total weight percentage from 5% to 60%.

The present invention further provides a third curing agent for eliminating amine blushing and amine blooming, consisting of six compounds represented by the structural Formulas (8), (9), (10), (11), (12) and (13) of the first curing agent respectively and six compounds represented by the structural Formulas (21), (22), (23), (24), (25) and (26) of the second curing agent respectively: wherein, R" is H, $C_4H_9$, $C_9H_{19}$ or $C_{15}H_{2X+1}$, and X is any integer from 12 to 15; R', $R'_1$, $R'_2$ and $R'_3$ are polyamine radicals; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixtures produced in Mannich condensation reaction; Ø is benzene ring; the compounds of Formulas (8), (9) and (10) in the first curing agent have a total weight percentage from 40% to 95%; the compounds of Formulas (11), (12) and (13) have a total weight percentage from 5% to 60%; the compounds of Formulas (21), (22) and (23) in the second curing agent have a total weight percentage from 40% to 95%; the compounds of Formulas (24), (25) and (26) have a total weight percentage from 5% to 60%; the first curing agent in the third curing agent has a weight percentage from 5% to 95%; and the second curing agent has a weight percentage from 5% to 95%.

In the third curing agent for eliminating amine blushing and amine blooming, R' is a polyamine selected from the group consisting of aliphatic polyamine, araliphaticpolyamine, aromatic polyamine, cycloaliphatic polyamine, heterocyclic polyamine, poly(alkylene oxide) and polyaminoamide.

In the third curing agent for eliminating amine blushing and amine blooming, R' is a polyamine selected from the group consisting of aldimine or ketimine of aminoethylpiperazine (AEP) or aminoethylpiperazine (AEP), aldimine or ketimine containing at least one secondary amine, and aldimine or ketimine containing silicon.

By the accelerator, curing agent and diluent of the present invention, a quick and effective curing effect can be achieved in an environment of low temperature and high humidity, and ugly and destructive defects such as amine blushing, amine blooming extrudate or blooming will not occurred on a coated and constructed surface, so as to assure the coating will not be peeled off easily and improve the quality of the coated and constructed surface. The present invention has a low-cost feature and thus may be used extensively in the area of curing agents.

BRIEF DESCRIPTION OF THE DRAWINGS

Nil

DESCRIPTION OF THE PREFERRED EMBODIMENTS

The technical characteristics, contents, advantages and effects of the present invention will be apparent with the detailed description of a preferred embodiment accompanied with related drawings as follows.

To overcome the problems and drawbacks of the prior art, the present invention provides a solution by modifying the chemical structure of the original coating and adjust the recipe and proportion appropriately, and also reduces the manufacturing cost to offer a price close to the price of the conventional curing agent. In addition, the curing agent manufactured by Air-Products and Chemicals, Inc., USA requires hydrogen gas and a high-pressure reactor for the operation and uses high-priced noble metal, so that the price of products of the present invention is lower than the price of products manufactured by Air-Products and Chemicals, Inc., USA.

The inventor of the present invention, who is also the inventor of the previous invention (P.R.C. Pat. No. 103102506) provides an accelerator for eliminating amine blushing and amine blooming, consisting of seven compounds represented by the following structural Formulas (1), (2), (3), (4), (5), (6) and (7) respectively:

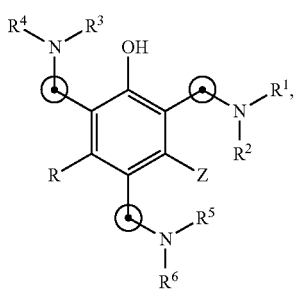

(1)

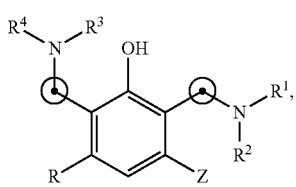

(2)

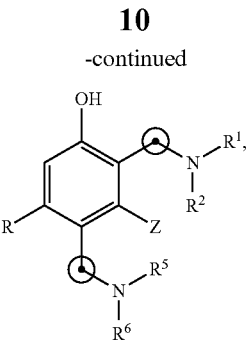

(3)

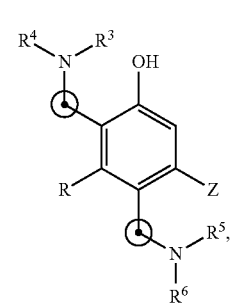

(4)

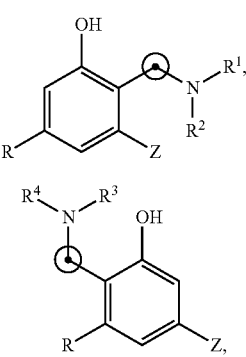

(5)

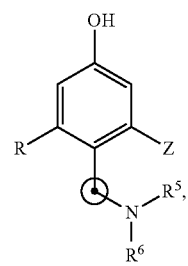

(6)

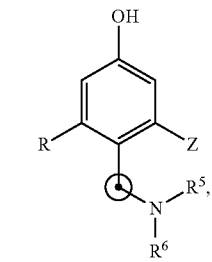

(7)

Wherein, R is $C_4H_9$, $C_9H_{19}$ or $C_{15}H_{2X+1}$, and X is any integer from 12 and 15; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixture produced in Mannich condensation reaction; the compound of Formula (1) has a weight percentage from 40% to 95%; the compounds of Formulas (2), (3) and (4) have a total weight percentage from 2.5% to 30%; and the compounds of Formulas (5), (6) and (7) have a total weight percentage from 2.5% to 30%.

In a preferred embodiment, ⊙ is a radical moiety of benzaldehyde produced in Mannich condensation reaction.

In another preferred embodiment, the accelerator may be a diluent of a curing agent.

In an embodiment, the present invention further provides a first curing agent for eliminating amine blushing and amine blooming, consisting of six compounds represented by the following structural Formulas (8), (9), (10), (11), (12) and (13) respectively:

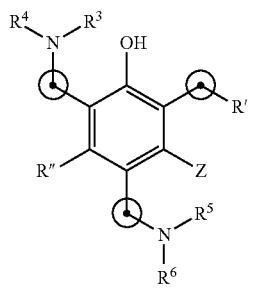

(8)

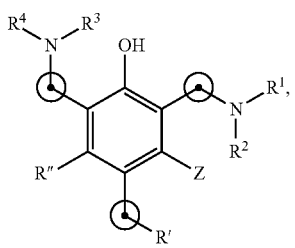

(9)

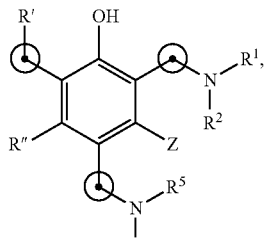

(10)

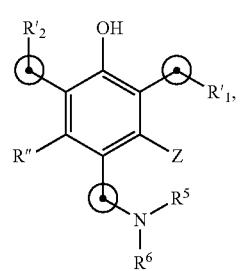

(11)

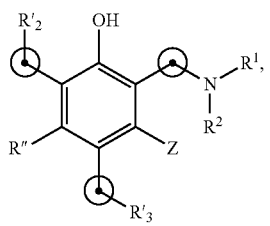

(12)

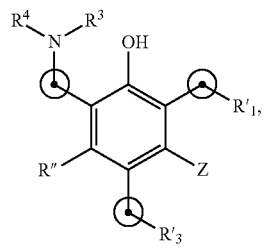

(13)

Wherein, R″ is H, $C_4H_9$, $C_9H_{19}$ or $C_{15}H_{2X+1}$, and X is any integer from 12 to 15; R′, $R'_1$, $R'_2$ and $R'_3$ are polyamines radicals; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixtures produced in Mannich condensation reaction; the compounds of Formulas (8), (9) and (10) have a total weight percentage from 40% to 95%; and the compounds of Formulas (11), (12) and (13) have a total weight percentage from 5% to 60%.

In a preferred embodiment, ⊙ is a radical moiety of benzaldehyde produced in Mannich condensation reaction.

In an embodiment, the present invention further provides a diluent of an accelerator or a curing agent for eliminating amine blushing and amine blooming, consisting of seven compounds represented by the following structural Formulas (14), (15), (16), (17), (18), (19) and (20) respectively:

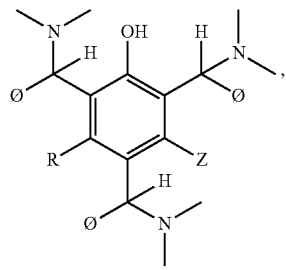

(14)

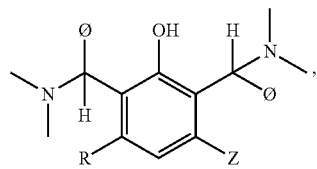

(15)

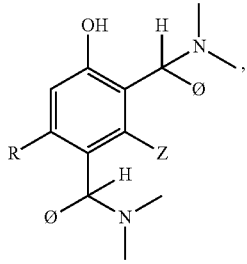

(16)

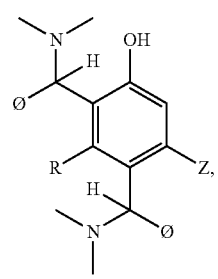

(17)

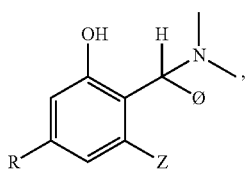

(18)

-continued

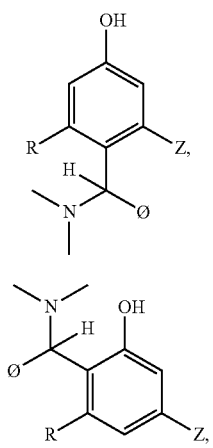
(19)

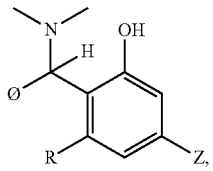
(20)

Wherein, R is $C_4H_9$, $C_9H_{19}$ or $C_{15}H_{2X+1}$, and X is any integer from 12 to 15; $R^1$, $R^2$, $R^3$, $R^4$, $R^5$ and $R^6$ are $CH_3$, $C_2H_5$, $C_3H_7$ or $C_4H_9$; Z is H or OH; Ø is benzene ring; the compound of Formula (14) has a weight percentage from 40% to 95%; the compounds of Formulas (15), (16) and (17) have a total weight percentage from 2.5% to 30%; and the compounds of Formulas (18), (19) and (20) have a total weight percentage from 2.5% to 30%.

In an embodiment, the present invention further provides a second curing agent for eliminating amine blushing and amine blooming, consisting of fix compounds represented by the following structural Formulas (21), (22), (23), (24), (25) and (26) respectively:

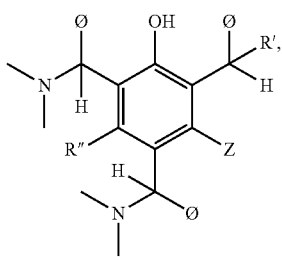
(21)

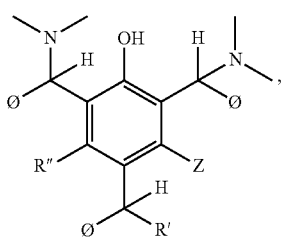
(22)

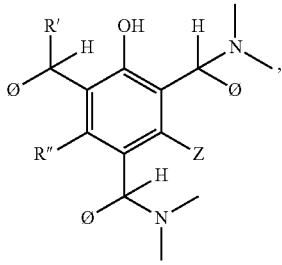
(23)

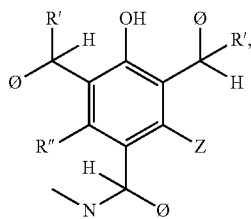
(24)

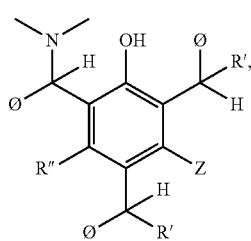
(25)

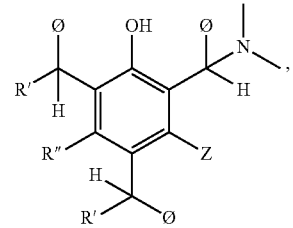
(26)

Wherein, R" is H, $C_4H_9$, $C_9H_{19}$ or $C_{15}H_{2X+1}$, and X is any integer from 12 to 15; R' is a polyamine radical; $R^1$, $R^2$, $R^3$, $R^4$, $R^5$ and $R^6$ are $CH_3$, $C_2H_5$, $C_3H_7$ or $C_4H_9$; Z is H or OH; ⊙ is benzene ring; the compounds of Formulas (21), (22) and (23) have a total weight percentage from 40% to 95%; and the compounds of Formulas (24), (25) and (26) have a total weight percentage from 5% to 60%.

In an embodiment, the present invention further provides a third curing agent for eliminating amine blushing and amine blooming, consisting of six compounds represented by the following structural Formulas (8), (9), (10), (11), (12) and (13) of the first curing agent respectively and six compounds represented by the following structural Formulas (21), (22), (23), (24), (25) and (26) of the second curing agent respectively, wherein, R" is H, $C_4H_9$, $C_9H_{19}$ or $C_{15}H_{2X+1}$, and X is any integer from 12 to 15; R', $R'_1$, $R'_2$ and $R'_3$ are polyamine radicals; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixtures produced in Mannich condensation reaction; Ø is benzene ring; the compounds of Formulas (8), (9) and (10) in the first curing agent have a total weight percentage from 40% to 95%; the compounds of Formulas (11), (12) and (13) have a total weight percentage from 5% to 60%; the compounds of Formulas (21), (22) and (23) in the second curing agent have a total weight percentage from 40% to 95%; the compounds of Formulas (24), (25) and (26) have a total weight percentage from 5% to 60%; the first curing agent in the third curing agent has a weight percentage from 5% to 95%; and the second curing agent has a weight percentage from 5% to 95%.

In a preferred embodiment, R' is a polyamine selected from the group consisting of aliphatic polyamine, araliphaticpolyamine, aromatic polyamine, cycloaliphatic polyamine, heterocyclic polyamine, poly(alkylene oxide) and polyaminoamide.

In another preferred embodiment, R' is a polyamine selected from the group consisting of aldimine or ketimine of aminoethylpiperazine (AEP) or aminoethylpiperazine (AEP), aldimine or ketimine containing at least one secondary amine, and aldimine or ketimine containing silicon.

Preferably, the polyamine represented by R' includes but not limited to aliphatic polyamine, araliphatic polyamine, aromatic polyamine, cycloaliphatic polyamine, heterocyclic polyamine, poly(alkylene oxide), polyaminoamide or their mixtures, or any other polyamine well known to persons having ordinary skill in the art.

The aliphatic polyamine of the present invention includes but not limited to polyethylene polyamine, wherein the polyethylene polyamine is one selected from the group consisting of ethylenediamine, diethylenetriamine, triethylenetetramine, tetraethylenepentamine, propylenediamine, dimethylaminopropylamine, 1,4-butanediamine, 1,3-pentanediamine, 1,6-hexamethylenediamine or their mixtures, or any aliphatic polyamine well known to persons having ordinary skill in the art.

The poly(alkylene oxide) of the present invention includes but not limited to poly(oxypropylene)diamine, triamine or their mixture, or any other poly(alkylene oxide) well known to persons having ordinary skill in the art. Wherein, triamine may be purchased from Huntsman Corporation, and the Product Nos. are Jeffamine® D230, D400, D2000, D5000, and T403.

The cycloaliphatic polyamine of the present invention includes but not limited to isophorone diamine, diaminocyclohexane or their mixture, or any other cycloaliphatic polyamine well known to persons having ordinary skill in the art.

The aromatic polyamine of the present invention includes but not limited to toluene diamine, or any other aromatic polyamine well known to persons having ordinary skill in the art.

The heterocyclic polyamine of the present invention includes but not limited to aldimine or ketimine of aminoethylpiperazine (AEP) or aminoethylpiperazine (AEP), or any other polyamine including aldimine and ketimine of at least one secondary amine, or aldimine and ketimine containing silicon, or aldimine or ketimine of any other heterocyclic polyamine well known to persons having ordinary skill in the art.

In the present invention, cardanol or cardol is used as a starting material to manufacture an accelerator, a curing agent and a diluent, and they are highly hydrophobic and environmentally friendly natural products. Wherein, the accelerator or diluent is manufactured by cardanol and cardol through Mannich condensation reaction, and the curing agent is a product obtained by performing a Mannich condensation reaction of cardanol and cardol and then a transamination of the polyamine, or a curing agent obtained by reacting phenol with formaldehyde and other aldehyde (such as benzaldehyde) and polyamine. The present invention uses cardanol and cardol as a highly hydrophobic curing agent obtained from a raw material which is contributed by the long-chain structure (as indicated by R in the structural formulas of the present invention) and the 15-carbon long-chain structure provides a highly lipophilic curing agent of the present invention.

Since the curing agent of the present invention has a dimethylamino group and a hydroxyl group also having some hydrophilicity, therefore the curing agent of the present invention can be reacted in water at a temperature lower than room temperature and has an effective effect of resisting amine blushing and amine blooming.

In an embodiment of the present invention, the use of epoxy resin further illustrates the technical measure of the present invention. However, it is noteworthy that polyurethane resin, polyurea resin or polyisocyanate resin in addition to epoxy resin are considered to be covered by the scope of the present invention.

In this embodiment, the present invention is mixed with epoxy resin BE188 (provided by Chang Chun Plastic Co., Ltd., Taiwan) in the ratio of 1:1, and the coating film completely hardened for approximately 12 hours is observed and determined whether or not amine blushing or amine blooming is produced, and the coating film is cleaned and dried, and then gently touched by a right index finger to check if there is any oily substance on the surface. If no oil substance is on the surface, then the film surface is touched with force again. If there is no oil substance found, then the first testing stage passes. The process is waited for another 12 hours (It is now 24 hours after hardening), and then the same test is taken again. If no spots such as amine blushing and amine blooming are produced, then the whole test is passed.

In the first embodiment of the present invention, the first curing agent is formed by six compounds represented by Formulas (8), (9), (10), (11), (12) and (13) respectively, wherein the total weight percentage of the compounds represented by Formulas (8), (9) and (10) is equal to 80%; the total weight percentage of the compounds represented by Formulas (11), (12) and (13) compound is equal to 20%, and R" is $C_{15}H_{2x+1}$, X is any integer from 12 to 15; R', $R'_1$, $R'_2$ and $R'_3$ are diethylenetriamine (DETA); $R^1$, $R^2$, $R^3$, $R^4$, $R^5$ and $R^6$ are $CH_3$; Z is H; and after the test, no amine blushing, amine blooming or any other spot is produced, so that the first embodiment passes the test.

In the second embodiment of the present invention, the second curing agent is formed by six compounds represented by Formulas (21), (22), (23), (24), (25) and (26) respectively, wherein the total weight percentage of the compounds represented by Formulas (21), (22) and (23) is equal to 80%; the total weight percentage of the compounds represented by Formulas (24), (25) and (26) is equal to 20%; R" is $C_{15}H_{2X+1}$, and X is any integer from 12 to 15; R' is diethylenetriamine (DETA); Z is H; and after test, no amine blushing, amine blooming or other spots is found, so that the second embodiment also passes the test.

In summation of the description above, the present invention has better price, environmental protection and effects than the products manufactured by Air-Products and Chemicals, Inc., USA.

What is claimed is:

1. A first curing agent for eliminating amine blushing and amine blooming, consisting of six compounds represented by the following structural Formulas (8), (9), (10), (11), (12) and (13) respectively:

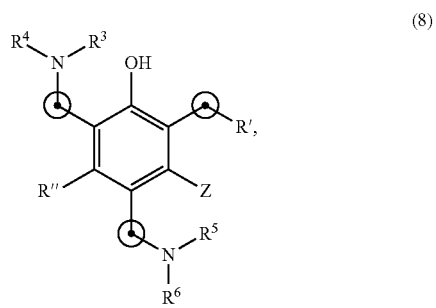

-continued

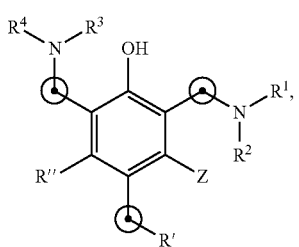
(9)

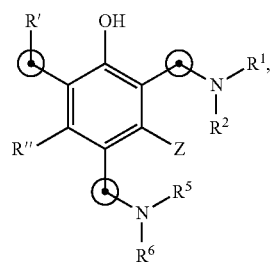
(10)

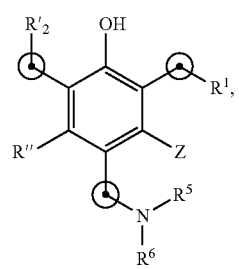
(11)

-continued

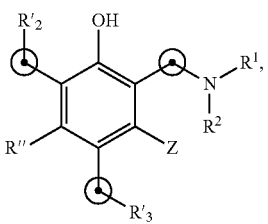
(12)

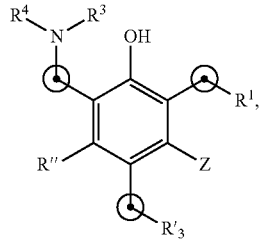
(13)

wherein, R″ is H, $C_4H_9$, $C_9H_{19}$ or $C_{15}H_{2X+1}$, and X is any integer from 12 to 15; R′, $R'_1$, $R'_2$ and $R'_3$ are polyamine radicals; $R^1$, $R^2$, $R^3$, $R^4$, $R^5$ and $R^6$ are $CH_3$, $C_2H_5$, $C_3H_7$ or $C_4H_9$; Z is H or OH; ⊙ is a radical moiety of formaldehyde, acetaldehyde, propionaldehyde, butyraldehyde or benzaldehyde and their mixtures produced in Mannich condensation reaction; the compounds of Formulas (8), (9) and (10) have a total weight percentage from 40% to 95% with respect to the total weight of the compounds of Formulas (8)-(13); and the compounds of Formulas (11), (12) and (13) have a total weight percentage from 5% to 60% with respect to the total weight of the compounds of Formulas (8)-(13).

2. The first curing agent for eliminating amine blushing and amine blooming according to claim 1, wherein ⊙ is a radical moiety of benzaldehyde produced in Mannich condensation reaction.

* * * * *